Patented Apr. 23, 1929.

1,709,989

UNITED STATES PATENT OFFICE.

LEOPOLD LASKA, FRIEDRICH KRECKE, AND FRITZ WEBER, OF OFFENBACH-ON-THE-MAIN, GERMANY, ASSIGNORS TO GRASSELLI DYESTUFF CORPORATION, OF NEW YORK, N. Y., A CORPORATION OF DELAWARE.

AZODYESTUFFS AND PROCESS OF MAKING SAME.

No Drawing. Application filed September 29, 1927, Serial No. 222,934, and in Germany October 5, 1926.

Our invention relates to new azodyestuffs corresponding in form of free acids probably to the general formula:

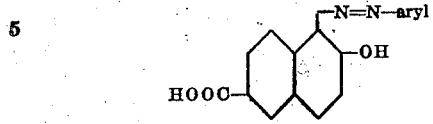

wherein aryl means a residue of the benzene series, which may be obtained by combining aromatic diazocompounds with 2.6-naphthol carboxylic acid. The new dyestuffs are when dry red to brown powders soluble in concentrated sulfuric acid with a reddish color, yielding upon reduction with stannous chloride 1-amino-2-hydroxy-naphthalene-6-carboxylic acid and an arylamino compound. They dye wool yellowish red to brown tints, turning to blue to violet to black shades when after-chromed, they dye cotton reddish to brownish shades by the chrome-printing process and are also suitable for producing valuable color lakes.

In order to further illustrate our invention the following examples are given the parts being by weight and all temperatures in centigrade degrees; but we wish to be understood, that our invention is not limited to the particular products or reacting conditions mentioned therein.

*Example 1.*—93 parts of aniline are diazotized in the usual manner. The diazo solution thus obtained is allowed to run in into an aqueous solution of 210 parts of the sodium salt of 2.6-naphthol carboxylic acid with addition of such an amount of sodium acetate as necessary for neutralizing the free mineral acid. At the end of the combination the solution is made alkaline and the dyestuff is separated by adding common salt. The new dyestuff in form of free acid having probably the formula:

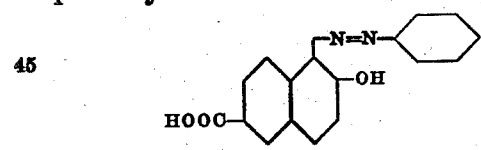

dyes wool yellowish red shades, more yellow than the corresponding combination with 2.3-hydroxynaphthoic acid and surpassing it as to tinctorial power and solubility. The combination may also be carried out in alkaline solutions.

*Example 2.*—A diazo solution, prepared in the usual manner from 207,5 parts of para-chloroaniline-ortho-sulfonic acid, is mixed with an aqueous solution of 210 parts of the sodium salt of 2.6-naphthol carboxylic acid, containing an amount of sodium acetate sufficient for neutralizing the free mineral acid. For finishing the combination the solution is made alkaline with carbonate of soda and the dyestuff separated by adding common salt. The new dyestuff in form of free acid having probably the formula:

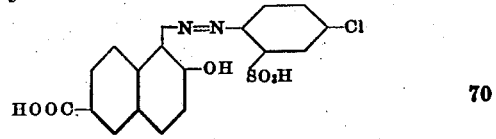

dyes wool yellowish red shades, more bluish and fuller than those of the corresponding dyestuff derived from 2.6-naphthol sulfonic acid. The solubility of the dyestuff is better than of the corresponding combination with 2.3-naphthol-carboxylic acid.

*Example 3.*—154 parts of para-nitro-ortho-aminophenol are diazotized in the usual manner and the diazo solution thus obtained combined with an aqueous solution of 210 parts of the sodium salt of 2.6-naphthol carboxylic acid, containing such an amount of carbonate of soda, that after addition of the mineral acid diazo solution the liquor is alkaline with bicarbonate. When the combination is complete the dyestuff is salted out. The new dyestuff in form of free acid having probably the formula:

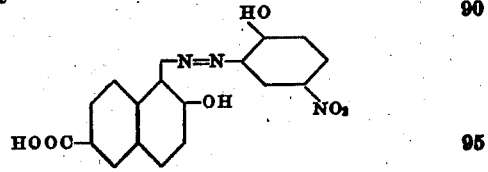

dyes wool brown, when dyed with addition of ammonium chromate, black-brown shades. The dyeings are fuller than those of the corresponding dyestuffs derived from 2.3-naphthol carboxylic acid and 2.6-naphtholsulfonic acid. The solubility is good, better than of the combination with 2.3-hydroxynaphthoic acid.

*Example 4.*—234 parts of ortho-nitro-ortho-aminophenol-para-sulfonic acid are diazotized in the usual manner and the diazo solution is mixed in presence of carbonate of soda with an aqueous solution of 210 parts of the sodium salt of 2.6-naphthol carboxylic acid. When the combination is complete, the dyestuff in form of free acid, having probably the formula:

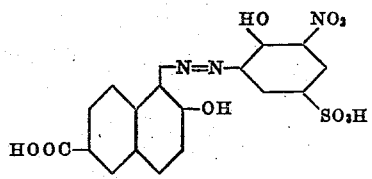

is separated by adding salt to the solution. It dyes wool in acid solution violet shades, when after chromed, fuller than those of the corresponding combination with 2.6-naphthol sulfonic acid. The solubility of the dyestuff is better than of the dyestuff, derived from 2.3-naphthol carboxylic acid.

In the following table some further dyestuffs, derived from 2.6-naphthol carboxylic acid, are named.

| Diazocompound of— | Dyed material | Shades |
|---|---|---|
| Picraminic acid | Wool, afterchromed | Brownish black. |
| 1.2-aminonaphthol-4-sulfonic acid | Do. | Dark blue. |
| Para-chloro-ortho-amino-phenol-ortho-sulfonic acid | Do. | Violet. |
| Para-nitro-ortho-amino-salicylic acid | Do. | Reddish brown. |
| Ortho-aminophenol-para-sulfonic acid | Do. | Violet. |
| 2-hydroxy-3-carboxy-5-sulfobenzene-azo-α-naphthylamine of the formula:<br>HOOC—⬡—OH, SO₃H, —N=N—⬡⬡—NH₂ | Do. | Dark violet. |
| 6.8 disulfonaphthalene-2-azo-α-naphthylamine of the formula:<br>SO₃H, HO₃S—⬡⬡—N=N—⬡⬡—NH₂ | Wool in acid solution | Dark violet. |
| Tetra-azocompound of benzidine-meta-disulfonic acid (combined with two equivalents of 2.6-naphtholcarboxylic acid) | Cotton, chrome printing | Reddish brown. |
| Tetra-azocompound of ortho-tolidine-meta-disulfonic acid (combined with two equivalents of 2.6-naphtholcarboxylic acid) | Do. | Reddish brown. |
| Tetra-azocompound of meta-dichlorobenzidine-disulfonic acid (combined with two equivalents of 2.6-naphtholcarboxylic acid) | Do. | Reddish brown. |
| 2.1-naphthylamine sulfonic acid | Wool in acid solution | Red. |
| Ortho-toluidine-meta-sulfonic acid of the formula:<br>SO₃H, —CH₃, NH₂ | Do. | Red. |
| Acetyl-para-phenylene diaminesulfonic acid | Do. | Red. |
| Para-toluidine-meta-sulfonic acid of the formula:<br>H₂N—⬡—CH₃, SO₃H | Barium- and calcium-lake | Red. |
| Aniline-ortho-sulfonic acid | Do. | Red. |

We claim:

1. As new products the azodyestuffs corresponding in form of free acids probably to the general formula:

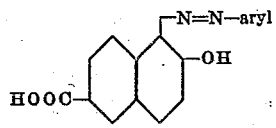

wherein aryl means a residue of the benzene series, which are when dry red to brown powders soluble in concentrated sulfuric acid with a reddish color, yielding upon reduction with stannous chloride 1-amino-2-hydroxynaphthalene-6-carboxylic acid and an arylaminocompound of the benzene series, dyeing wool yellowish red to brown tints, turning to blue to violet to black shades when afterchromed, dyeing cotton reddish to brownish shades by the chromeprinting process and being suitable for producing valuable color lakes.

2. As a new product the azodyestuff corresponding in form of free acid probably to the formula:

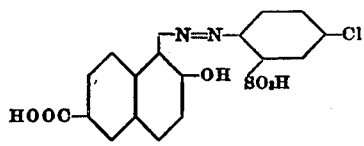

being when dry a reddish powder, yielding on reduction with stannous chloride 1-amino-2-hydroxynaphthalene-6-carboxylic acid and para-chloroaniline-ortho-sulfonic acid, dyeing wool yellowish red shades.

3. A fibrous material dyed with the dyestuffs claimed in claim 1.

4. A fibrous material dyed with the dyestuff claimed in claim 2.

In testimony whereof, we affix our signatures.

LEOPOLD LASKA.
FRIEDRICH KRECKE.
FRITZ WEBER.